(No Model.) 6 Sheets—Sheet 3.

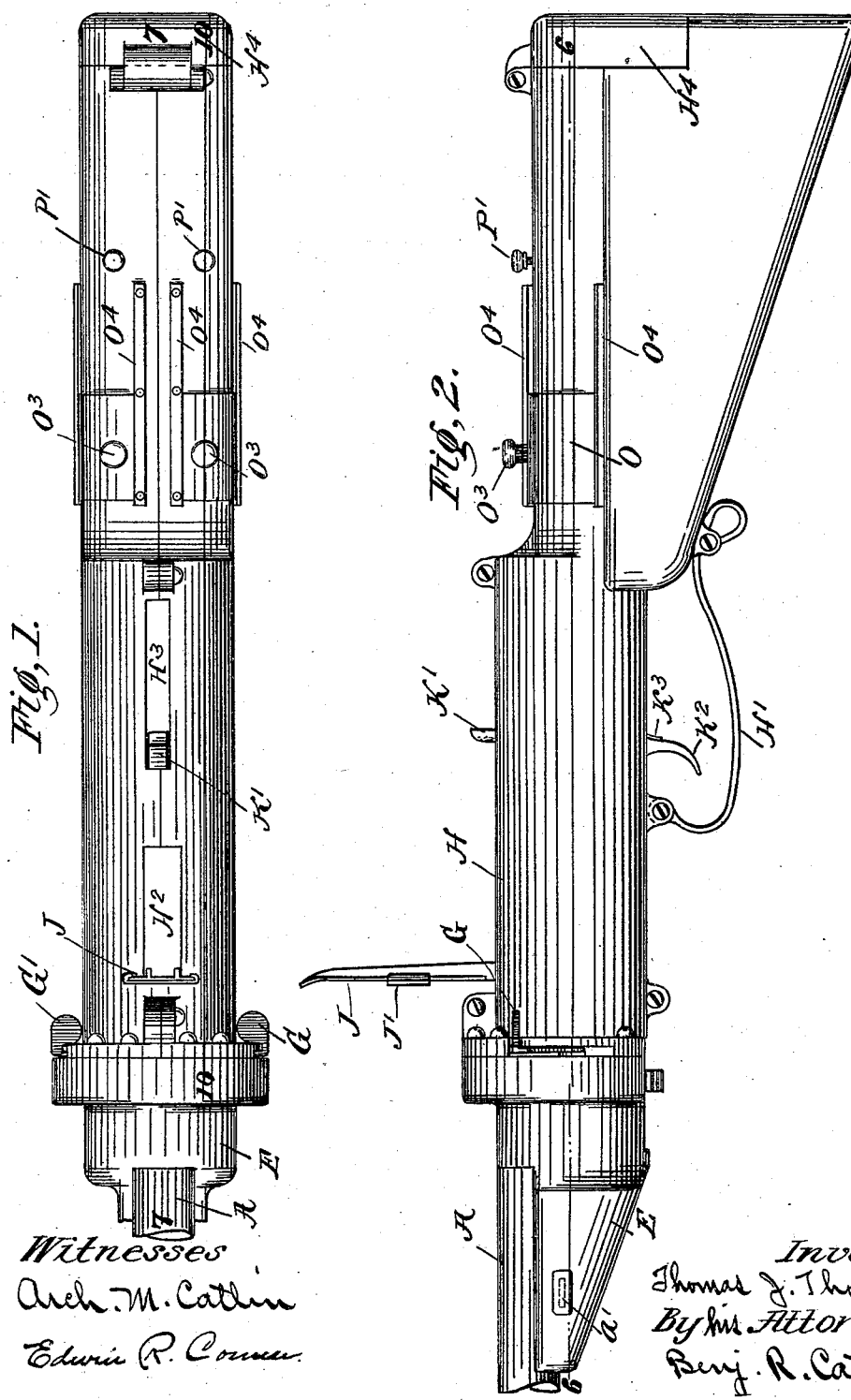

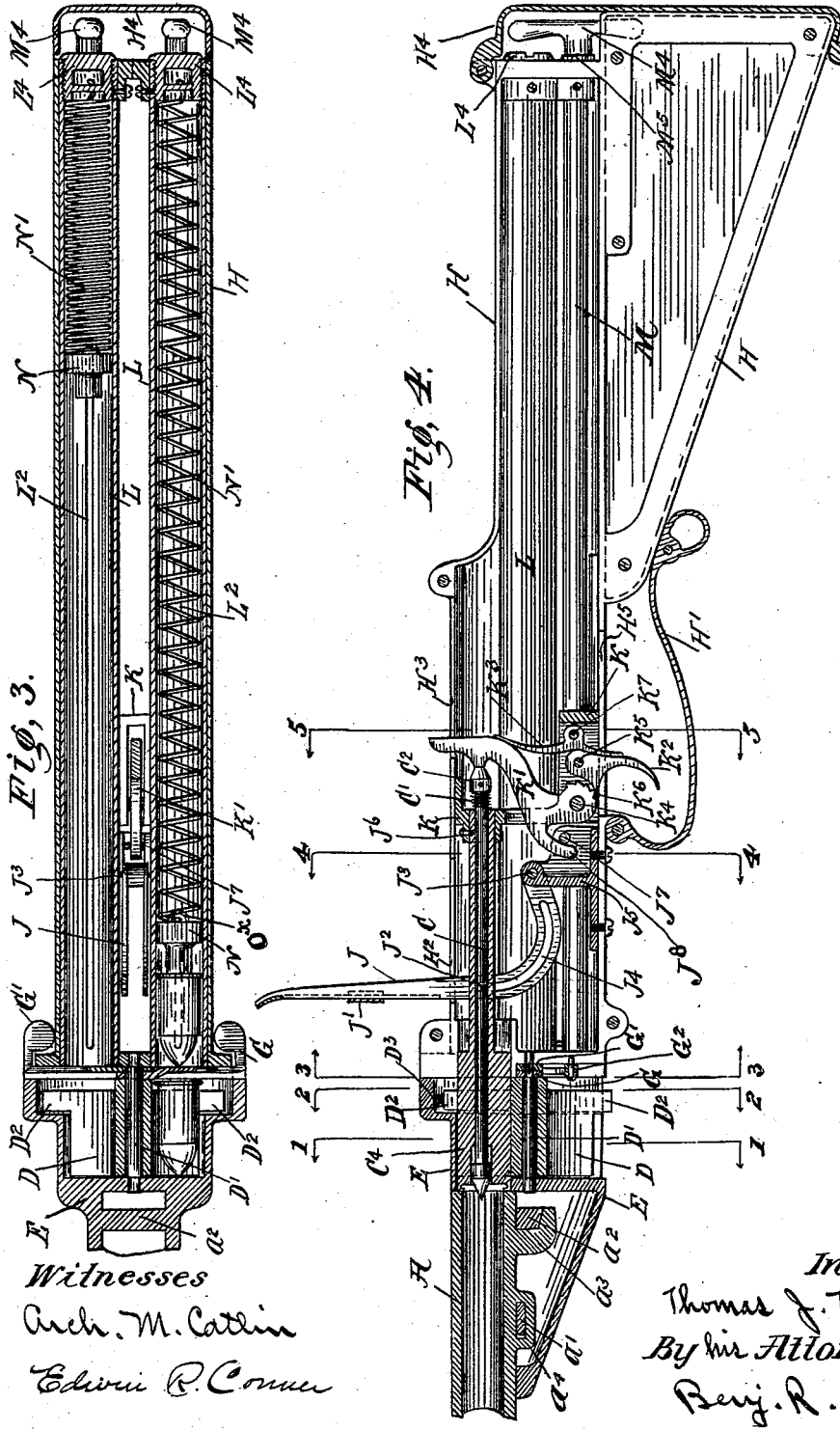

T. J. THORP.
MAGAZINE GUN.

No. 473,370. Patented Apr. 19, 1892.

Witnesses
Arch. M. Catlin
Edwin R. Conner

Inventor
Thomas J. Thorp.
By his Attorney
Benj. R. Catlin (No Model.) 6 Sheets—Sheet 4.
T. J. THORP.
MAGAZINE GUN.
No. 473,370. Patented Apr. 19, 1892.
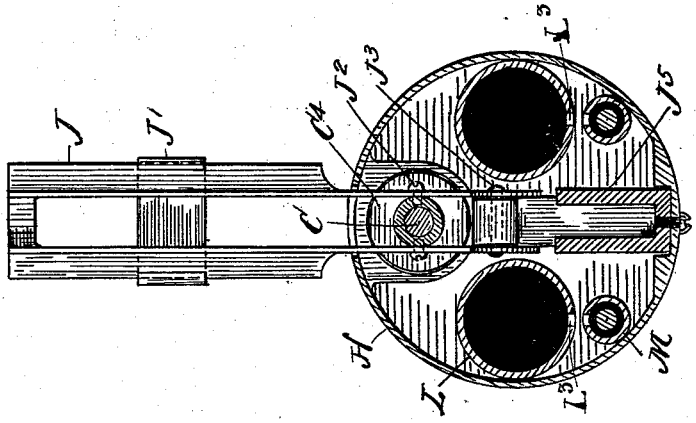
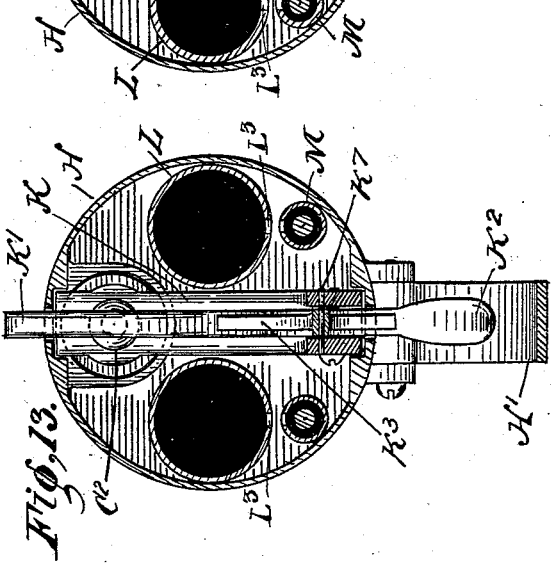
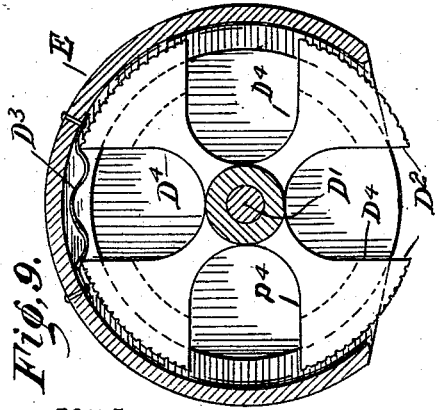
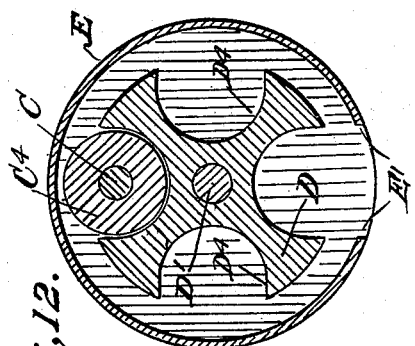
Witnesses
Arch. M. Catlin
Edwin R. Conner
Inventor
Thomas J. Thorp
By his Attorney
Benj. R. Catlin (No Model.)
T. J. THORP.
MAGAZINE GUN.
No. 473,370. Patented Apr. 19, 1892.
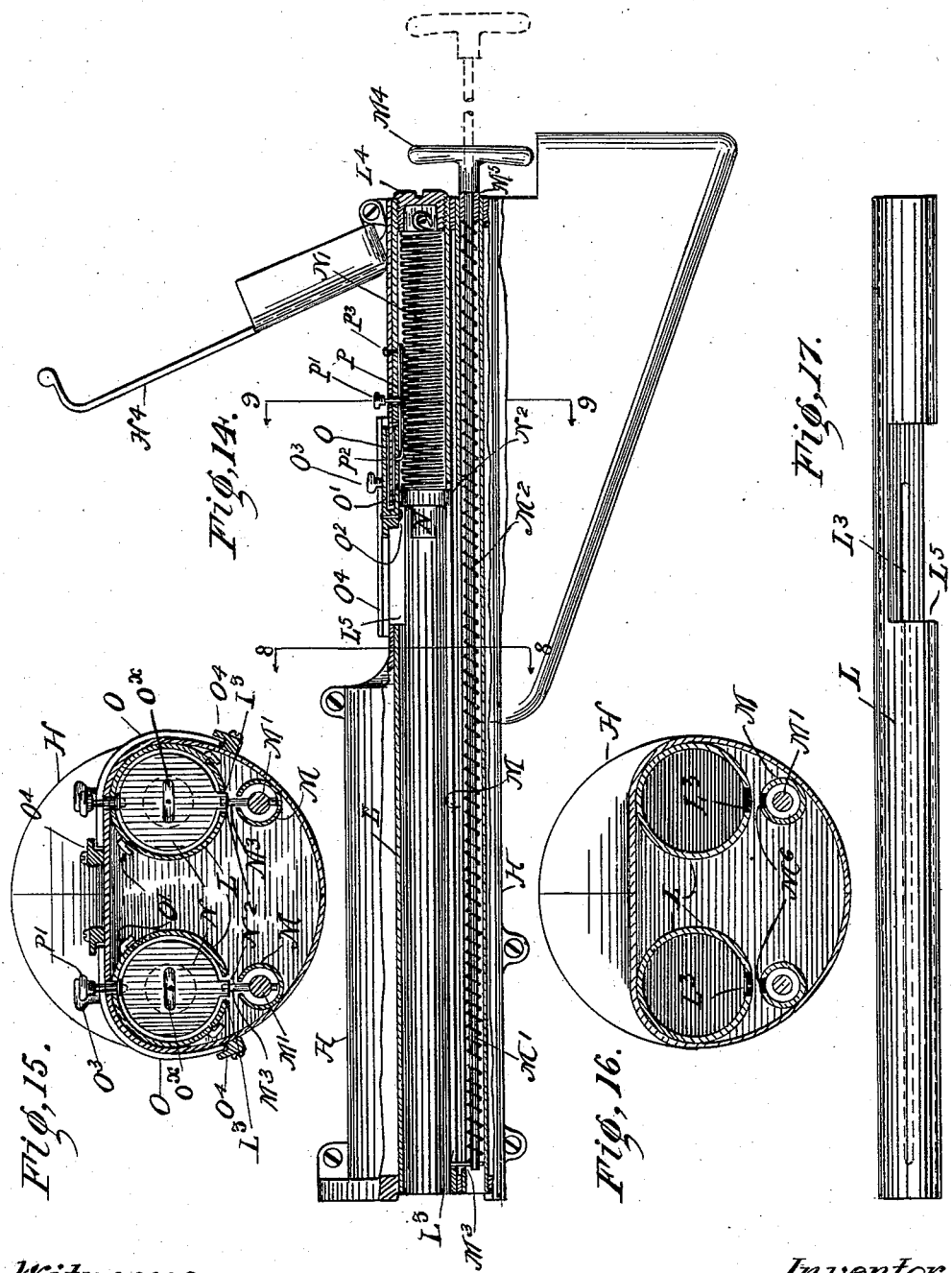

(No Model.) 6 Sheets—Sheet 6.
T. J. THORP.
MAGAZINE GUN.
No. 473,370. Patented Apr. 19, 1892.
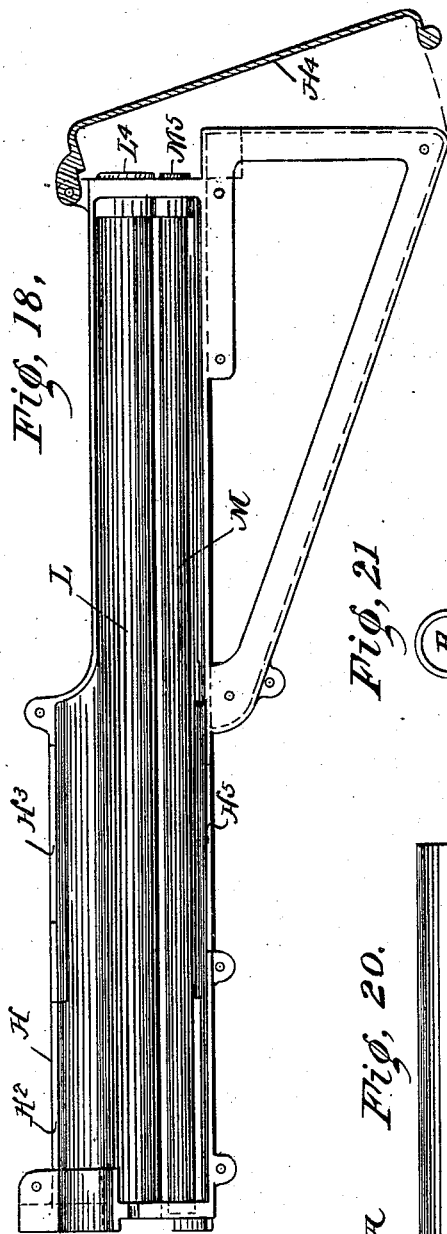
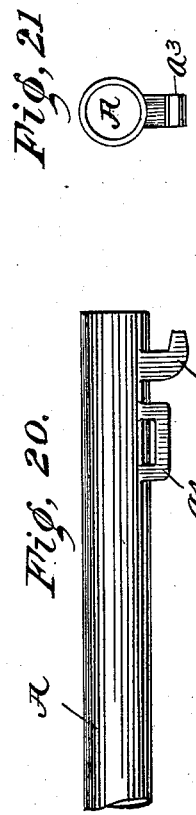
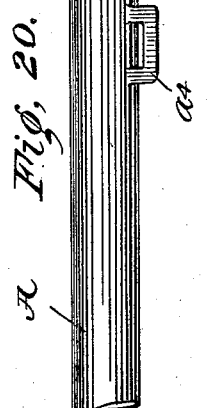
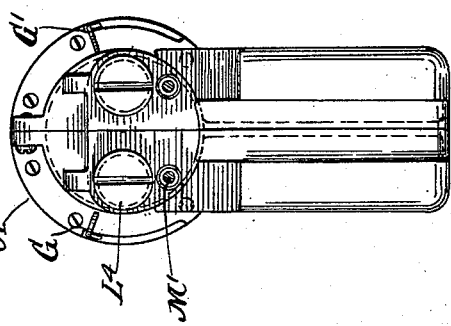
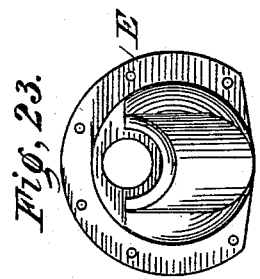
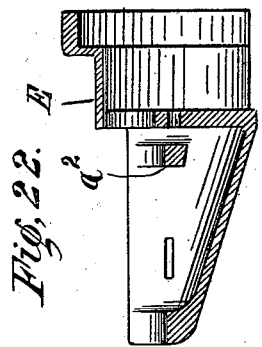
Witnesses
Arch. M. Catlin
Edwin R. Conner
Inventor
Thomas J. Thorp
By his Attorney
Benj. R. Catlin

UNITED STATES PATENT OFFICE.

THOMAS J. THORP, OF CHICAGO, ILLINOIS.

MAGAZINE-GUN.

SPECIFICATION forming part of Letters Patent No. 473,370, dated April 19, 1892.

Application filed May 27, 1891. Serial No. 394,293. (No model.)

*To all whom it may concern:*

Be it known that I, THOMAS J. THORP, a resident of Chicago, in the county of Cook and State of Illinois, have invented certain new and useful Improvements in Magazine-Guns; and I do hereby declare the following to be a full, clear, and exact description of the invention, such as will enable others skilled in the art to which it pertains to make and use the same.

The invention relates to magazine-firearms, and has for its objects to secure certainty and safety in action and to simplify and cheapen the construction so far as consistent with the attainment of these advantages; and it consists in the matters hereinafter described, and particularly pointed out in the claims.

Figure 7:
Figure 6:
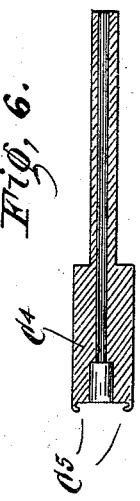
Figure 5:
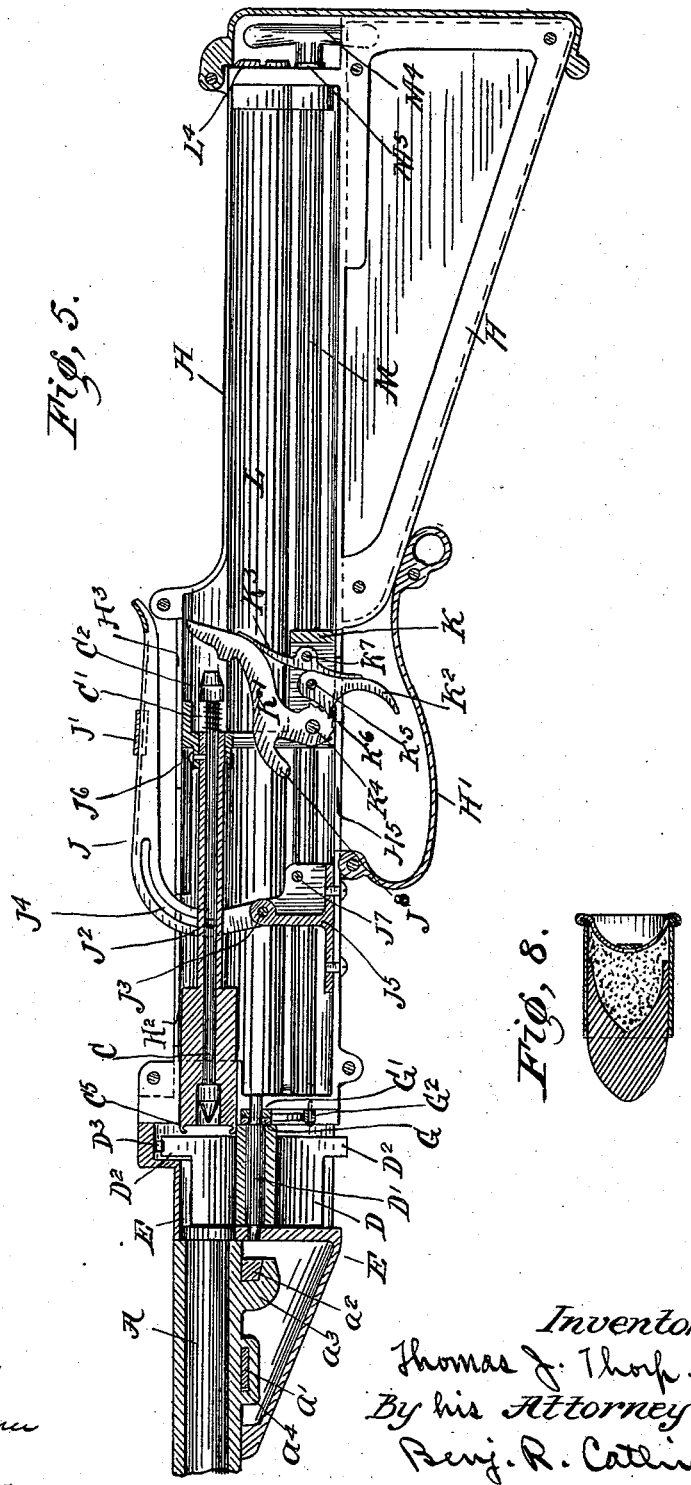
Figure 8:
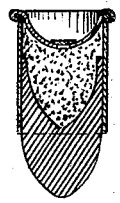

In the accompanying drawings, Figure 1 is a plan of the combined stock and receiver and breech-frame, the barrel being broken away in part. Fig. 2 is a side elevation of the same. Fig. 3 is a section on line 6 6 of Fig. 2. Fig. 4 is a section on the line 7 7 of Fig. 1 and showing parts situated as immediately after exploding the cartridge, the latter being omitted. Fig. 5 is a similar view, the gun being shown as cocked. Fig. 6 is a longitudinal section of the breech-block, and Fig. 7 an end elevation of the same. Fig. 8 is a section of a cartridge. Fig. 9 is a transverse section on line 2 2 of Fig. 4. Fig. 10 is a transverse section on line 3 3. Fig. 11 is a like view on line 4 4. Figs. 12 and 13 are similar views on line 1 1. Fig. 14 is a longitudinal section on line 10 10 of Fig. 1, the breech-plate being shown in raised or opened position. Fig. 15 is a section on line 9 9 of Fig. 14. Fig. 16 is a section on line 8 8 of Fig. 14. Fig. 17 is an elevation of a cartridge-magazine. Fig. 18 is a central side elevation of one section or half of the stock and receiver, showing cartridge, magazine, and subjacent plunger-tube, the breech-plate being shown in section and partially opened and the plunger and handle omitted. Fig. 19 is an end elevation of the two sections of the stock and receiver secured together, the breech-plate and breech mechanism being omitted. Fig. 20 is a side and Fig. 21 an end elevation of the barrel; and Fig. 22 is a longitudinal section, and Fig. 23 an end elevation, of the breech-frame.

All the transverse sections, except that of Fig. 10, are seen from the right. Fig. 19 is viewed from the right and Figs. 10 and 23 from the left. The sections shown in Figs. 9 to 13, inclusive, and Figs. 15 and 16 are on an enlarged scale.

The reference-letter A indicates the gun-barrel. The combined stock and breech receiver which holds the breech mechanism is composed of two parts H, fastened together in the central vertical longitudinal plane of the gun by means of suitable flanges and screws or the like, as indicated. The barrel is secured to this receiver by the medium of an interposed breech-frame E, which is fastened to the receiver.

$a^2$ is a transverse bridge or bar made fast in the breech-frame and adapted to engage a hook $a^3$, fast on the gun-barrel.

$a^4$ is a loop on the barrel, adapted to receive a key $a'$, which passes through and is held in slots in the sides of the frame.

Within the combined stock and receiver are arranged two magazines L, closed at the rear by screw-plugs $L^4$. To these plugs are attached springs $N'$, the front ends of which are secured to staples $O^x$, fixed in the followers N. Beneath the magazines are two tubes M, containing rods or plungers having handles $M^4$ provided with tubular extensions $M^5$, adapted to fit the ends of the tubes M. To the handles $M^4$ are secured the rods $m'$, which at their forward ends are furnished with pins $M^3$, adapted to fit and move in slots $L^3$, formed in the bottom of the magazines. Projections $N^2$ on the followers N also move in these grooves. These projections are engaged by the pins whenever the followers are in their forward position, as occurs when the magazines are emptied of cartridges. At such times by withdrawing a rod $M'$ its pin $M^3$ moves the follower toward the rear and compresses the spring, the opening $L^5$ in the magazine being thereby left unobstructed by the spring, whereupon if the sliding cover O be withdrawn by means of its handle $O^3$ the opening $L^5$ is entirely unobstructed and the magazine can be charged with cartridges. To permit the above-described withdrawal of the plunger-rods $M'$, the breech-plate $H^4$ is turned back on its hinges, as shown in Fig. 14.

P is a spring secured at $P^3$ and provided with a knob $P'$ and also with a pin $P^2$, adapted to engage an opening in the slide O, from which it can be disengaged by pressing upon the knob P'. The spring $M^2$ forces the rod M' back into its tube when the handle is released after charging the magazine with cartridges. At such time the spring N' tends to push forward the follower N and the cartridges.

In Fig. 3 are shown a magazine emptied and having its follower withdrawn and spring-compressed, (see, also, Fig. 14,) and also a second magazine having therein a single cartridge, a second cartridge discharged from the magazine and resting in the carrier D being also shown. This carrier revolves on an axis D', having bearings in the breech-frame and in the receiver. It is furnished with four openings or chambers $D^4$, which can be made to register with the magazine at will by revolving the carrier by means of its milled head $D^2$, the breech-frame being open below to give easy access to said head, which has four divisions, corresponding to the cartridge-chambers $D^4$ in the carrier.

Upon the axle D' are pivotally supported the spring-held stop-plates G and G', which normally close the end of the magazine and resist the tendency of the springs N' to push out the cartridges. Either of said plates can be moved out of the path of a cartridge at will by means of the thumb-piece thereon, the spring $G^2$ being compressed in the operation and automatically returning the plate over the end of the magazine when said plate is released. The carrier when revolved is held in proper alignment by a spring $D^3$. Either plate G or G' can be moved from in front of a magazine and the carrier can be revolved in either direction, and cartridges therefore can be taken from either magazine at will. The proper turning of the carrier D carries a cartridge, which has been pushed therein by spring N', into alignment with the bore of the gun and in situation to be pushed therein and exploded, which operations are effected by the devices to be next described.

$C^4$ is a breech-block movably supported at its front end in a way formed in the end of receiver and in line with the bore of the gun and having its rear end secured to a hammer-carrying frame K, fitted to and movable lengthwise in the receiver.

C is a firing-pin having a head $C^2$ and a recoil-spring C'.

K' is the hammer pivoted at $K^4$, its upper end extended through an opening $H^3$ in the receiver.

Within the guard H' is the trigger $K^2$, pivoted at $K^5$.

The sear $K^6$ is held in engagement with the hammer by means of the spring $K^3$, pivoted at $K^7$. Said spring also operates the hammer and forces forward the firing-pin when the hammer is relieved from the sear by pulling the trigger. The trigger extends down through a slot $H^5$ in the receiver. The hammer is located between the magazines. (See Fig. 13.)

The hammer-carrying frame is attached in the present instance by means of a pin or screw $J^6$ to the rear of the breech-block, to be moved longitudinally by means of the lever J, which supports an adjustable sight J', said lever having a fulcrum at $J^3$ and being attached to the breech-block by means of screws $J^2$. (See Fig. 11.) These screws pass loosely through slots $J^4$ in the lever.

$H^2$ is a slot in the receiver to permit the movements of said lever. The fulcrum $J^3$ is supported in a bracket $J^5$, made fast to the bottom of the receiver. By turning lever J on its fulcrum or pivot the breech-block is moved toward the front or rear, as the case may be, and as the block is attached to the hammer-supporting frame that is also moved.

$H^5$ is a slot in the receiver for the trigger. As shown in Fig. 4, the parts are in their forward position, while their rearward position is shown in Fig. 5. In the latter position the lever lies close to the receiver and the hammer is withdrawn within the same and is thoroughly guarded. Even should the lever J be accidentally thrown up and the hammer-frame slid forward, the hammer is not thereby operated. It is also guarded by the lever against an accidental operation, such as may occur by carelessly drawing the gun through a fence or through brush.

The hammer is driven forward to explode the fulminate in the cartridge when in its forward position by pulling the trigger, which releases the sear and compresses the spring $K^3$, which immediately forces the hammer against the firing-pin and moves it through the breech-block and explodes the cartridge, the retracting-pin C' being compressed in the operation.

The cartridge having been carried up by the before-described movement of the carrier D, and thereby pushed across the end of the breech-block, which at such time is in the position shown in Fig. 5, has its flange or rim engaged by the lips $C^5$ of the breech-block. After the cartridge has been pushed into the barrel it, or after its explosion its shell, can be withdrawn by the breech-block having said lips into a chamber $D^4$ and thereupon extracted by rotating the carrier. When the chamber holding the cartridge or shell, as the case may be, is moved to the lower side, its contents are dropped out through an opening E' in the frame. Obviously the cartridges could be thus removed before their explosion. The rearward movement of the lever J and of the hammer cocks the same by the agency of the finger $J^8$, which overhangs the fixed pin $J^7$ in such manner that the hammer is turned back on its pivot as the frame K moves away from said pin $J^7$ until the finger is released. The engagement of this pin with the finger $J^8$ (see Fig. 4) locks the breech-block and hammer-frame through the medium of the hammer until such time as the latter is turned back on its pivot by means of lever J and the finger thus lifted from the pin.

Many of the mechanical details of construction illustrated can be changed without departure from the invention, provided the mechanical principles and operation are not materially varied.

The invention is not limited to the use of two magazines nor to magazines of a particular capacity, and portions of the invention may be used without others, if desired.

Having thus described my invention, what I desire to secure by Letters Patent is—

1. The combined stock and receiver made in two longitudinal halves secured together by screws or the like and having an inclosed cartridge-magazine extending to near the butt of the stock, having an opening for the insertion of cartridges, substantially as set forth.

2. The combination of the barrel, the breech-frame provided with an opening E', and the breech-block receiver with the cartridge-magazine and the revolving chambered cartridge-carrier journaled to revolve at the end of the barrel and in the breech-frame and having a part extending into the opening, whereby the carrier can be revolved and a cartridge or shell removed, substantially as set forth.

3. The combined receiver and stock having a chamber extending from the breech-frame to or near to the butt of the stock and a magazine located in said chamber and a plunger-rod provided with a projection, the magazine being slotted to receive the projection, a cartridge-forcing spring, and a follower, said follower having a part located in the path of said projection, substantially as set forth.

4. The magazine located in the combined receiver and stock, a pivoted plate accessible to the hand from outside said receiver, said plate being normally extended across the mouth of the magazine, and a spring adapted to hold the plate in such position in a yielding manner, substantially as set forth.

5. The combined receiver and stock, the two magazines extending about the whole length thereof, the breech-block and firing-pin located above said magazines, and the hammer pivoted in the receiver and located between the magazines, substantially as set forth.

6. The combined receiver and stock, the two magazines extending about the whole length thereof, the breech-block and firing-pin located above said magazines, and the hammer pivoted in the receiver and located between the magazines, said hammer normally extending through a slot in the receiver-wall and adapted to be moved into and entirely concealed within the receiver, substantially as set forth.

7. In a magazine-gun, the receiver, the breech-block and the hammer-frame, said block and frame being rigidly secured together and combined with mechanism for sliding them bodily in a right line in the receiver the length of a cartridge, and devices for locking the combined lock-frame and breech-block in their forward position, substantially as set forth.

8. The combination of the receiver, the sliding hammer-frame having the breech-block attached thereto, and the lever pivotally secured to said frame and provided with slots $J^4$, the said breech-block having pins engaging the lever in said slots, whereby the swinging of the lever on its fixed pivot moves the block and the hammer-frame and hammer, substantially as set forth.

9. The combination of the receiver, the sliding hammer-frame having the breech-block attached thereto, and the lever pivotally secured to said frame and provided with slots $J^4$, said breech-block having pins engaging the lever in said slots, whereby the swinging of the lever on its fixed pivot moves the block and the hammer-frame and hammer, said hammer having a finger $J^8$ engaging a fixed pin in the receiver, whereby when the frame is moved to the rear the hammer is cocked, substantially as set forth.

10. The combined stock and receiver, the magazines located in said receiver and extending about its whole length, said magazines being provided with cartridge-moving springs and with removable plugs, the plungers adapted to compress the spring, and the hinged breech-plate to give access to the plugs and to the plunger-handles, substantially as set forth.

In testimony whereof I have signed this specification in the presence of two subscribing witnesses.

THOMAS J. THORP.

Witnesses:
L. B. CONANT,
CHAS. S. CARTER.